(12) United States Patent
Ly et al.

(10) Patent No.: US 9,300,478 B2
(45) Date of Patent: Mar. 29, 2016

(54) SPLITTING CERTIFICATE STATUS RESPONSES EVENLY ACROSS MULTIPLE DISTRIBUTED CERTIFICATE STATUS RESPONDERS

(71) Applicant: SYMANTEC CORPORATION, Mountain View, CA (US)

(72) Inventors: Hoa Ly, San Jose, CA (US); Hari Veladanda, Pleasanton, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 14/186,591

(22) Filed: Feb. 21, 2014

(65) Prior Publication Data

US 2015/0244533 A1  Aug. 27, 2015

(51) Int. Cl.
*H04L 29/06* (2006.01)
*H04L 9/32* (2006.01)
*G06F 21/33* (2013.01)

(52) U.S. Cl.
CPC .............. *H04L 9/3268* (2013.01); *G06F 21/33* (2013.01)

(58) Field of Classification Search
CPC .............................. H04L 9/3268; G06F 21/33
USPC .......................................................... 713/156
See application file for complete search history.

(56) References Cited

U.S. PATENT DOCUMENTS

| 8,468,339 B2 * | 6/2013 | Parkinson et al. ............. 713/156 |
| 8,577,838 B2 * | 11/2013 | Murata ......................... 707/610 |
| 2008/0133906 A1 * | 6/2008 | Parkinson et al. ............. 713/156 |

* cited by examiner

*Primary Examiner* — Longbit Chai
(74) *Attorney, Agent, or Firm* — Patterson + Sheridan (57) ABSTRACT

Techniques are disclosed for evenly distributing certificate status validity messages across multiple response servers. A certificate authority (CA) may partition subsets of online certificate status protocol (OCSP) responses to each be handled by OCSP response servers. The partitions are based on serial numbers of the underlying digital certificates of the OCSP responses. For example, to determine which OCSP response server is assigned to distribute a particular OCSP response, a modulo operation may be performed between the last octet value of the underlying certificate serial number and the total number of available OCSP response servers of the CA. The result yields a partition number that may be used to identify the corresponding OCSP response server.

18 Claims, 5 Drawing Sheets

| CERTIFICATE SERIAL NUMBER ~305 | PARTITION NUMBER (SerialNumberLastOctet % AvailableOCSPResponders) ~310 | OSCP RESPONSE SERVER ~315 |
|---|---|---|
| eaae51caf05b61a110df281acbebd3b27bed5701 | 1 % 4 = 1 | 1 |
| 5f970df15f365ff0d5750fa48b81d0365b584902 | 2 % 4 = 2 | 2 |
| 011c08915554ea39912e2a1a79350fec67355603 | 3 % 4 = 3 | 3 |
| 1e975277fac1f09a385862fb2fb7381 3449f5204 | 4 % 4 = 0 | 0 |
| 9410c5f8c18724ae6818aca1634ca620ef5ca205 | 5 % 4 = 1 | 1 |
| 9ef2e59446e789f8d0e23b766560b23503ef6706 | 6 % 4 = 2 | 2 |
| ... | ... | ... |
| 672d308d43c4c4b199ed4701dccb80cac3dd6909 | 9 % 4 = 1 | 1 |

FIGURE 5

SPLITTING CERTIFICATE STATUS RESPONSES EVENLY ACROSS MULTIPLE DISTRIBUTED CERTIFICATE STATUS RESPONDERS

BACKGROUND

1. Field

Embodiments disclosed herein provide techniques for computer security. More specifically, techniques are disclosed for efficiently distributing certificate status validity messages to relying parties (e.g., client browser applications) by evenly partitioning subsets of responses to be distributed by certificate status responders.

2. Description of the Related Art

Various techniques exist for determining the validity of a digital certificate. For example, online certificate status protocol (OCSP) is a method for delivering a status of a digital certificate to a requesting client. Under OCSP, a web server may present a digital certificate to a browser application. In turn, the browser application ensures that the certificate is valid before accepting the certificate. To do so, the browser application requests an OCSP response from a certificate authority (CA) that issued the certificate. When the CA receives the OCSP request, the CA sends a digitally signed OCSP response to the browser application. Such a response indicates whether the certificate is valid, invalid, revoked, etc. Typically, the CA maintains an OCSP responder service that sends OCSP responses to requesting clients.

An OCSP response server typically handles billions of OCSP requests daily. Because many online commercial services rely on OCSP services to allow customers to verify that the commercial services are who they purport to be, it is important that the OCSP response server delivers OCSP responses quickly and efficiently. To meet response time requirements, rather than generate an OCSP response each time the CA receives an OCSP request, the OCSP response server may store OCSP responses, generated in advance, in an in-memory cache. Doing so significantly reduces OCSP response time. However, an issue arises as the number of certificates increases. That is, as the number of certificates increases, the number of OCSP responses increases. As a result, the demand for memory to accommodate the cached OCSP responses also increases. Thus, difficulties in managing a large volume of OCSP responses in light of response time requirements become a concern.

SUMMARY

One embodiment presented herein provides a method for responding to requests to determine a validity status of a digital certificate. This method may generally include receiving, by a first response server, a request to provide a status of a digital certificate. This method may also include evaluating the request to identify a response server, of a plurality of response servers, assigned to process the request. Upon determining the identified response server is the first response server, a certificate status validity message is sent. The certificate status validity message corresponds to the request to a requesting client. Otherwise, the request is forwarded to the identified response server.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Current approaches to distributing certificate status validity messages, such as online certificate status protocol (OCSP) responses, may use response servers that serve a subset of OCSP responses of a certificate authority (CA) based on a uniform resource locator (URL) provided in an OCSP request. One issue with relying on a URL is that a significant amount of existing certificates issued by different CA's reference the same URL. This results in an uneven distribution of OCSP responses because some CA's create more certificates than others.

Embodiments presented herein provide techniques for evenly distributing certificate status validity messages across multiple delivery servers. More specifically the serial numbers of certificates are used to distribute OCSP response requests to a group of servers. In one embodiment, pre-generated OCSP responses are partitioned into subsets. Further, a group of OCSP response servers each cache a subset of the OCSP responses. The subsets are assigned to each OCSP response server based on the serial numbers of the corresponding certificates. For instance, the OCSP response servers may be assigned a set of OCSP responses to distribute based on the last octet of a serial number and the total number of available OCSP response servers. More specifically, each OCSP response server could be assigned a partition number. In one embodiment, the CA performs a modulo operation using the last octet of a serial number of a certificate and the total number of available OCSP response servers. The result is used to assign the certificate to a corresponding OCSP response server (e.g., an OCSP response server with a matching partition number). Each OCSP response server stores OCSP responses for certificates mapping to the assigned partition number in a cache. Further, each OCSP response server may include a configuration file that specifies the numbered assignments of each OCSP response server of the CA.

Subsequently, when a client sends an OCSP request to the CA (e.g., through a browser), the receiving OCSP response server identifies the partition number using the serial number of the certificate. If the partition number (of the receiving server) matches the partition number assigned to process that certificate, the OCSP response server sends the response to the user. Otherwise, the OCSP response server forwards the OCSP request to a OCSP response server assigned to handle requests for that certificate.

Because certificate serial numbers are typically generated sequentially, or using non-colliding random process (e.g., a GUID), assigning OCSP response servers to distribute certificates based on serial numbers and the modulo operation ensures a relatively even distribution of OCSP responses to clients. Further, using a modulo operation provides a way for response servers to self-scale as the number of digital certificates and responses increases. Specifically, as the number of issued certificates increases, more OCSP response servers may be added to the infrastructure without disrupting the distribution of primary responsibility for serving OCSP responses.

Note, the following description relies on OCSP as a reference example as a protocol used for confirming the validity of a digital certificate. One of skill in the art will recognize that other methods of determining the validity of a digital certificate may also be applicable in the context of distributing certificate status validity messages evenly across responding servers. For example, the techniques described herein may be applied for any type of certificate status protocol that uses distinct serial numbers, batch numbers, or order numbers corresponding to the certificate or status message. Using the techniques described below, the status messages may be distributed relatively evenly.

Figure 1:
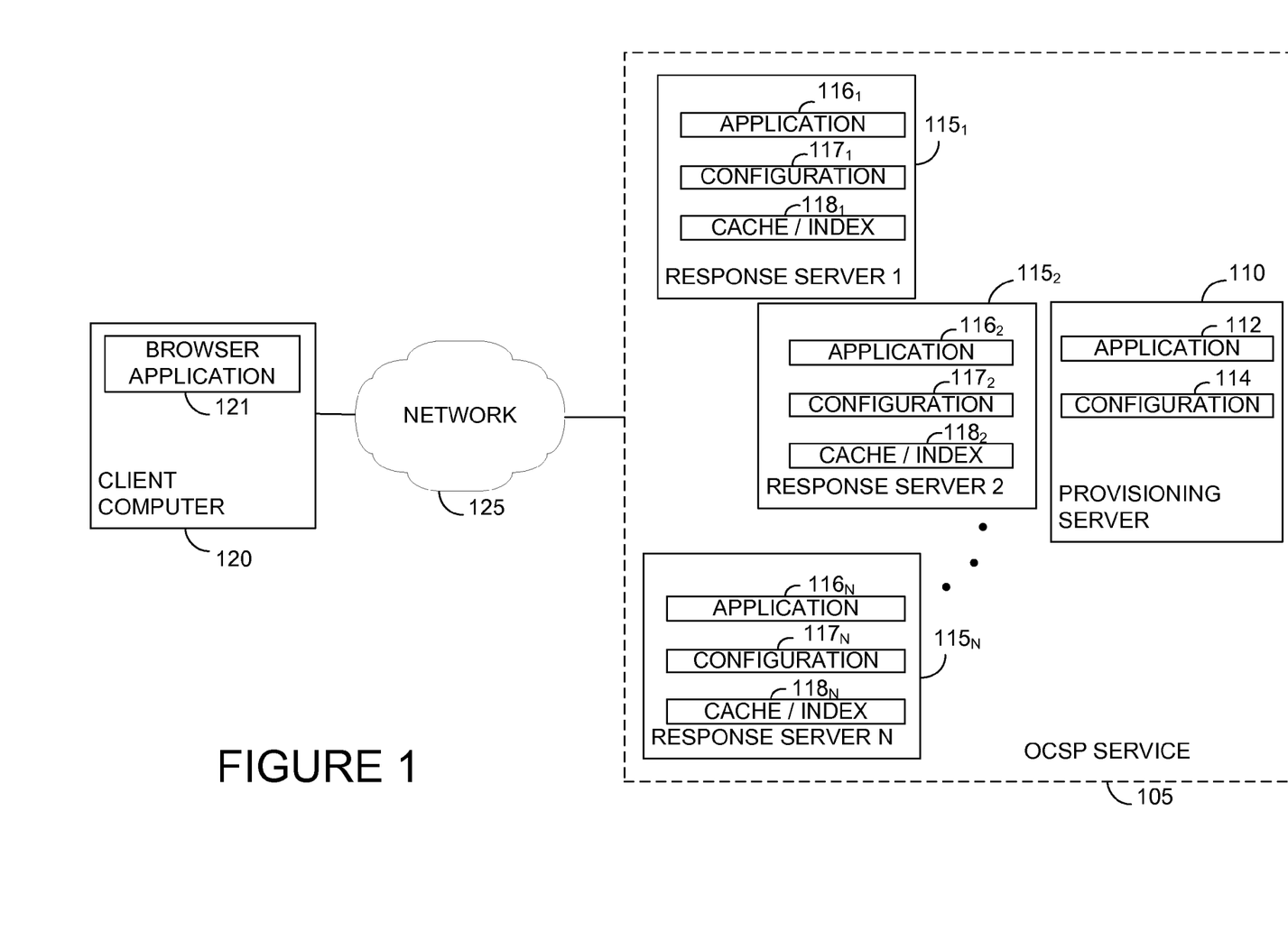
FIG. 1 illustrates an example computing environment, according to one embodiment.

FIG. 1 illustrates an example computing environment 100, according to one embodiment. As shown, the computing environment 100 includes an OCSP service 105 of a certificate authority (CA). The OCSP service 105 handles OCSP requests sent by a client computer 120 and distributes generated OCSP responses for each request via a network 125. In one embodiment, the OCSP service 105 may include an OCSP provisioning server 110 and multiple OCSP response servers $115_{1-N}$. The provisioning server 110 includes an application 112. The application 112 is configured to generate OCSP responses for certificates of the CA cached by response servers $115_{1-N}$ that are configured to serve corresponding assigned responses. Once an OCSP response for a particular certificate is generated, the application 112 stores the OCSP response in a database (not shown). Thereafter, an application 116 of each OCSP response server $115_{1-N}$ retrieves a subset of the OCSP responses stored in the database serve to requesting clients. To determine the subset of OCSP responses that a response server 115 is responsible for serving, the application 116 may perform a modulo operation on the last octet of the corresponding certificate serial number with the total number of available response servers $115_{1-N}$. The resulting value corresponds to a partition number of the assigned response server 115. As further described below, the assigned response server 115 is responsible for caching and serving OCSP responses that have a corresponding partition number.

The response servers $115_{1-N}$ distribute OCSP responses to requesting client computers 120. Each response server $115_{1-N}$ includes an application 116, configuration 117, and a cache/index 118. The configuration 117 includes information about the OCSP service 105, such as an assigned partition number and corresponding partition numbers of other response servers $115_{1-N}$.

As stated, the provisioning server 110 generates OCSP responses in advance. Once generated, the provisioning server 110 stores the OCSP responses in a database. Thereafter, each OCSP response server 115 retrieves a distinct subset of the OCSP responses. To do so, the OCSP response server 115 may perform a modulo operation using the last octet number of a serial number of each certificate and the total number of available response servers. The OCSP response server 115 caches the OCSP responses having a modulo result that corresponds to the assigned partition number of the OCSP response server 115. A configuration file 117 on each response server 115 specifies the assigned partition numbers of the response servers hosted by the OCSP service 105.

When an OCSP request is received, (e.g., from a browser application 121), the response server 115 determines a designated partition number for the corresponding response. In one embodiment, the response server 115 does so by calculating the modulo result of the last octet of the certificate serial number with the total number of available response servers 115. For example, assume that a client sends an OCSP request for a certificate where the last octet of the serial number is 4. Further, assume that the number of total available response servers 115 is 4. In this case, the modulo result is 0. If the designated partition number corresponds to the assigned number of the response server 115 (i.e., 0 in the example above), then the OCSP response server 115 is responsible for serving the OCSP response because the OCSP response is part of the partition cached by the server 115. Accordingly, the OCSP response server 115 retrieves the associated OCSP response stored in the cache and sends the response to the client computer 120. If not, the response server 115 forwards the OCSP response to the assigned response server 115 (i.e., the response server 115 having an assigned partition number of 0).

In another embodiment, the OCSP service 105 may include a load balancing server (not shown). In this approach, a load balancing server receives OCSP requests sent by client computers 120. Thereafter, the load balancing server determines a partition number associated with the request. To do so, the load balancing performs a modulo operation using the last octet of the serial number of the underlying digital certificate with the total number of available response servers 115. The load balancing server then forwards the request to the response server 115 associated with the result.

Figure 2:
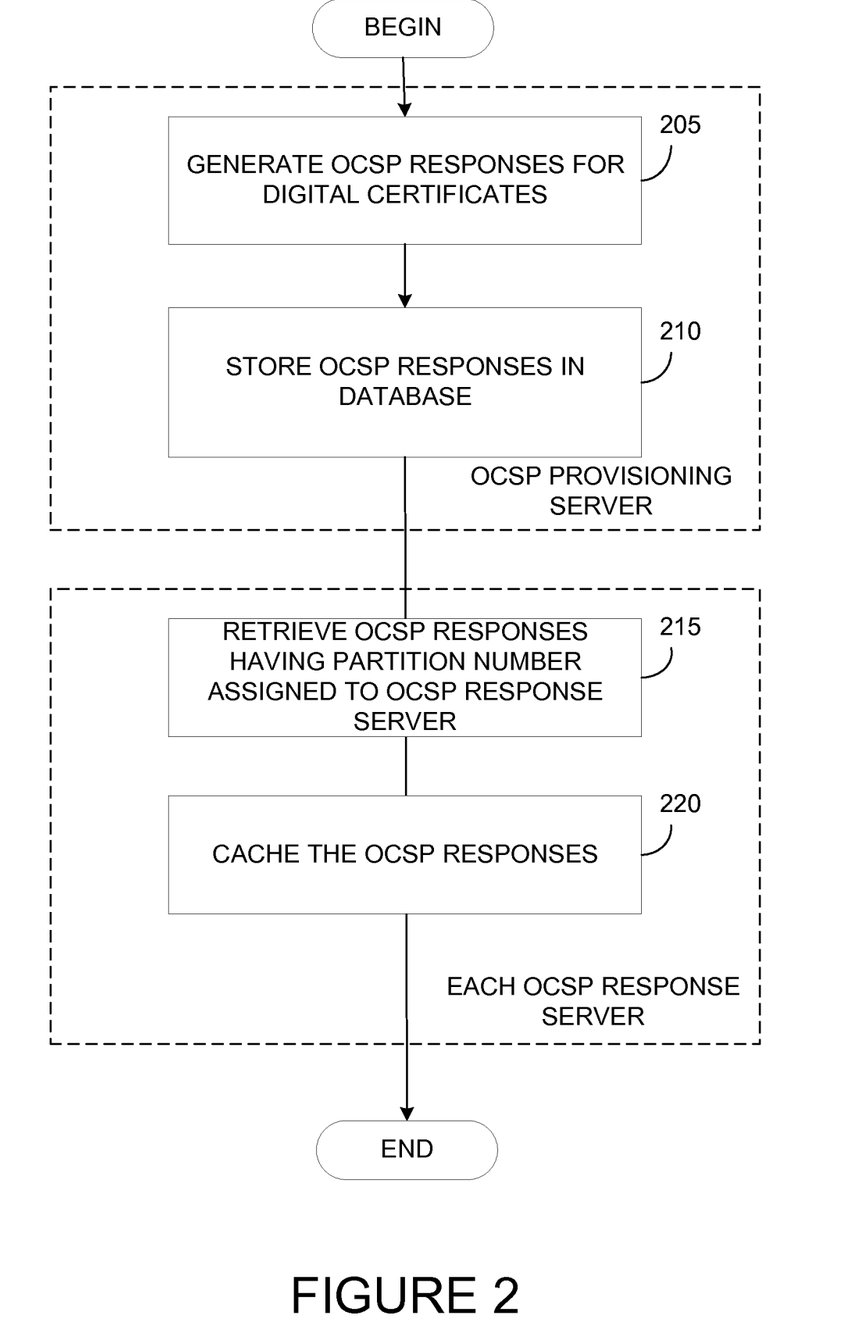
FIG. 2 illustrates a method for evenly distributing OCSP responses across multiple OCSP response servers, according to one embodiment.

FIG. 2 illustrates a method for evenly distributing OCSP responses across multiple OCSP response servers, according to one embodiment. An OCSP provisioning server may determine, in advance, a set of OCSP responses to generate. For example, the provisioning server may identify the most frequently requested OCSP responses. The method begins at step 205, where a provisioning server generates OCSP responses for a set of digital certificates.

At step 210, the provisioning server stores the OCSP responses in a database (or other data store). As noted, each response server may be assigned a partition number and is responsible for serving OCSP responses in that partition. Each OCSP response server retrieves OCSP responses from the database that has the partition number assigned to the OCSP response server (step 215). To do so, the OCSP response server performs a modulo operation using the last octet value of a serial number of a given certificate with the total number of available OCSP response servers. The equation may be represented as follows:

$$\text{SerialNumberLastOctet\%AvailableOCSPResponse Servers} = \text{Designated Partition Number} \quad (1)$$

For example, assume four OCSP response servers are available. Given a certificate with the following serial number: "eaae51caf05b61a110df281acbebd3b27bed5701," the last octet of this serial number is 1. To identify the partition number for the OCSP response for this certificate, the response server performs the following modulo operation:

$$1\%4=1 \qquad (2)$$

Thus, this certificate is assigned to a partition with a partition number of 1. A response server having 1 retrieves this OCSP response from the database. At step 215, the response server caches the OCSP responses having the partition number retrieved from the database. Continuing the previous example, the response server with an assigned partition number of 1 (based on the performed modulo operation) stores all OCSP response servers having a partition number of 1.

Figure 3:
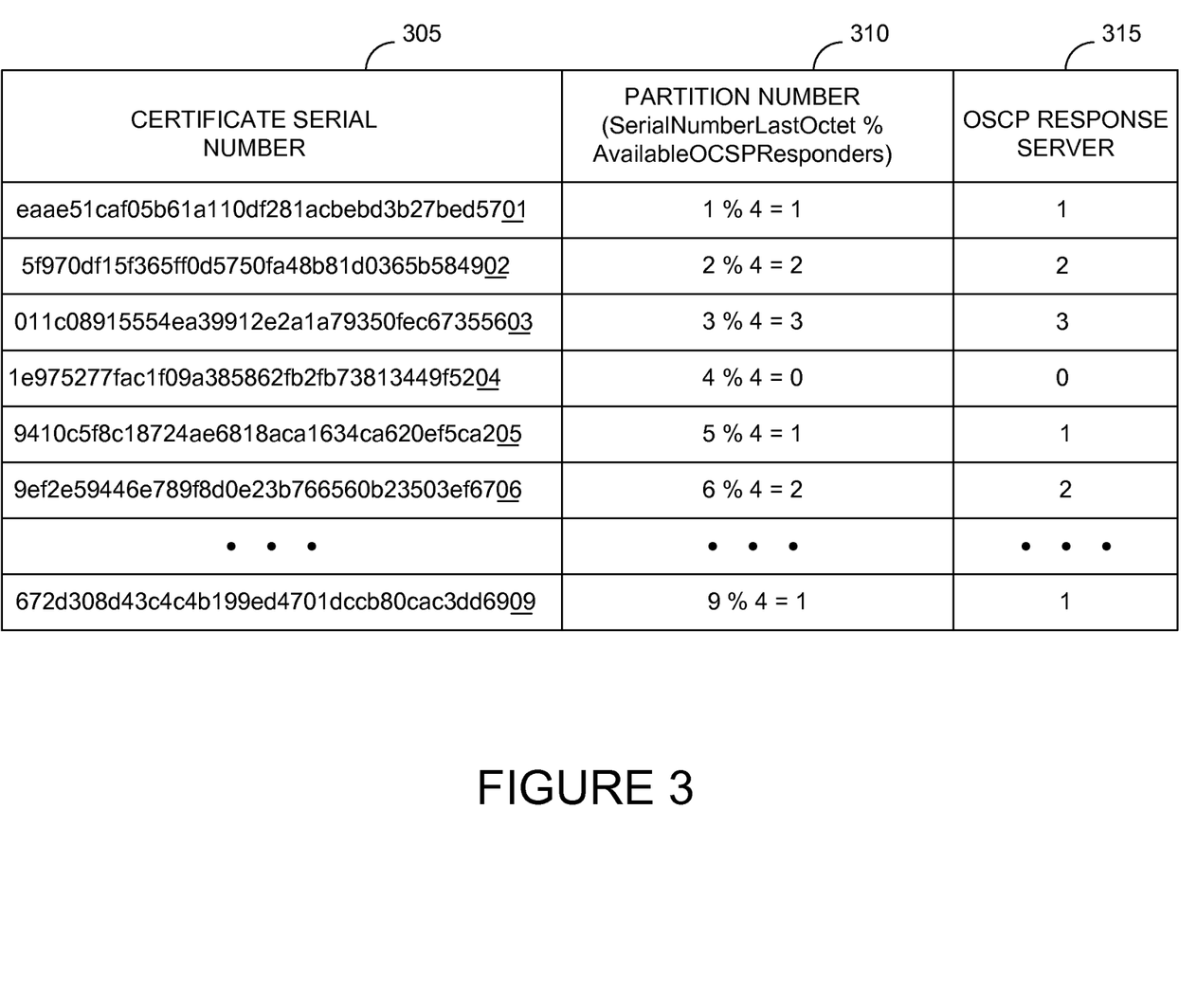
FIG. 3 illustrates an example distribution table of certificate status validity messages to response servers, according to one embodiment.

FIG. 3 illustrates an example distribution table 300 of OCSP responses to OCSP response servers. As shown, the table 300 provides a certificate serial number column 305, a partition number column 310, and an OCSP response server column 315. The certificate serial number column 305 lists serial numbers of CA certificates. Illustratively, the last octet numbers of each serial number in the column 305 are underlined.

The partition number column 310 lists partition number corresponding to each serial number in the certificate serial number column 305. As stated, the designated partition number for a given OCSP response may be calculated by performing a modulo operation on the corresponding certificate serial number with the total number of available OCSP response servers.

The OCSP response server column 315 lists OCSP response servers assigned to an OCSP response based on a given certificate serial number. In this example, assume that the OCSP response servers of a CA are numbered sequentially from 0 to N−1, where N is the total number of available OCSP responders. As a result, the partition numbers associated with each OCSP response map to each OCSP response server by the assigned number of each OCSP response server.

Typically, serial numbers for a digital certificate are generated through one of two approaches. One approach is to generate the serial numbers sequentially. The other approach is to generate the serial numbers using a non-colliding random process (e.g., GUID). As demonstrated in FIG. 4, using certificate serial numbers as a basis for partitioning subsets of OCSP responses to OCSP response servers results in a relatively even distribution of the OCSP responses across the response servers.

Figure 4:
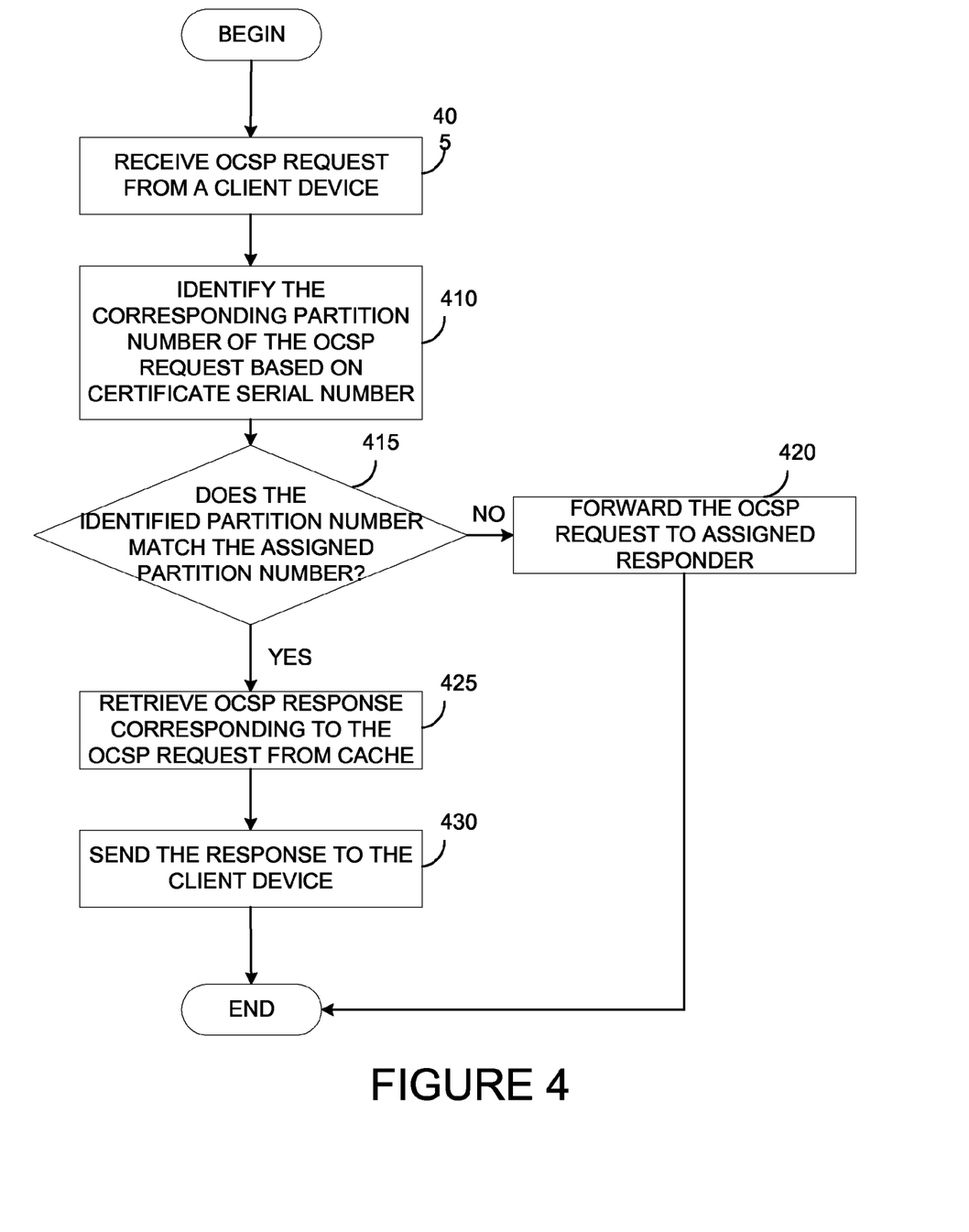
FIG. 4 illustrates a method for sending a certificate status validity message to a requesting client device based on a serial number of a corresponding certificate, according to one embodiment.

FIG. 4 illustrates a method 400 for sending an OCSP response to a requesting client based on a serial number of a corresponding certificate, according to one embodiment. At step 405, the OCSP response server receives an OCSP request from a client computer. Assume that the OCSP response server has an assigned partition number 3 and that the corresponding OCSP response is associated with a certificate with a hexadecimal serial number "8ef2e12846e789f8d0e23b766560b26503ef6707." Further, in this example, assume that the amount of available OCSP response servers is four.

At step 410, the OCSP response server identifies the partition number associated with the underlying certificate in the OCSP request. To do so, the OCSP response server first performs a modulo operation on the last octet of the serial number of the underlying certificate with the amount of available OCSP response servers. In this example, the last octet number is 0x7. Thus, a modulo operation between the last octet (7) and the number of available OCSP response servers (4) yields a partition number result of 3.

At step 415, the OCSP response server determines whether the identified partition number corresponds to the assigned partition number of the OCSP response server. If not, the OCSP response server identifies the assigned OCSP response server (e.g., via a cache index) and forwards the OCSP request to the identified server (at step 420).

Otherwise, if the identified partition number corresponds to the assigned partition number of the OCSP server, then the OCSP response server retrieves the corresponding OCSP response from the cache (at step 425). In the continuing example, the partition number assigned to the OCSP response server corresponds to the identified partition number of 3. As a result, the OCSP response server retrieves the OCSP response that corresponds to the request sent by the client. At step 430, the OCSP response server sends the OCSP response to the client computer.

Figure 5:
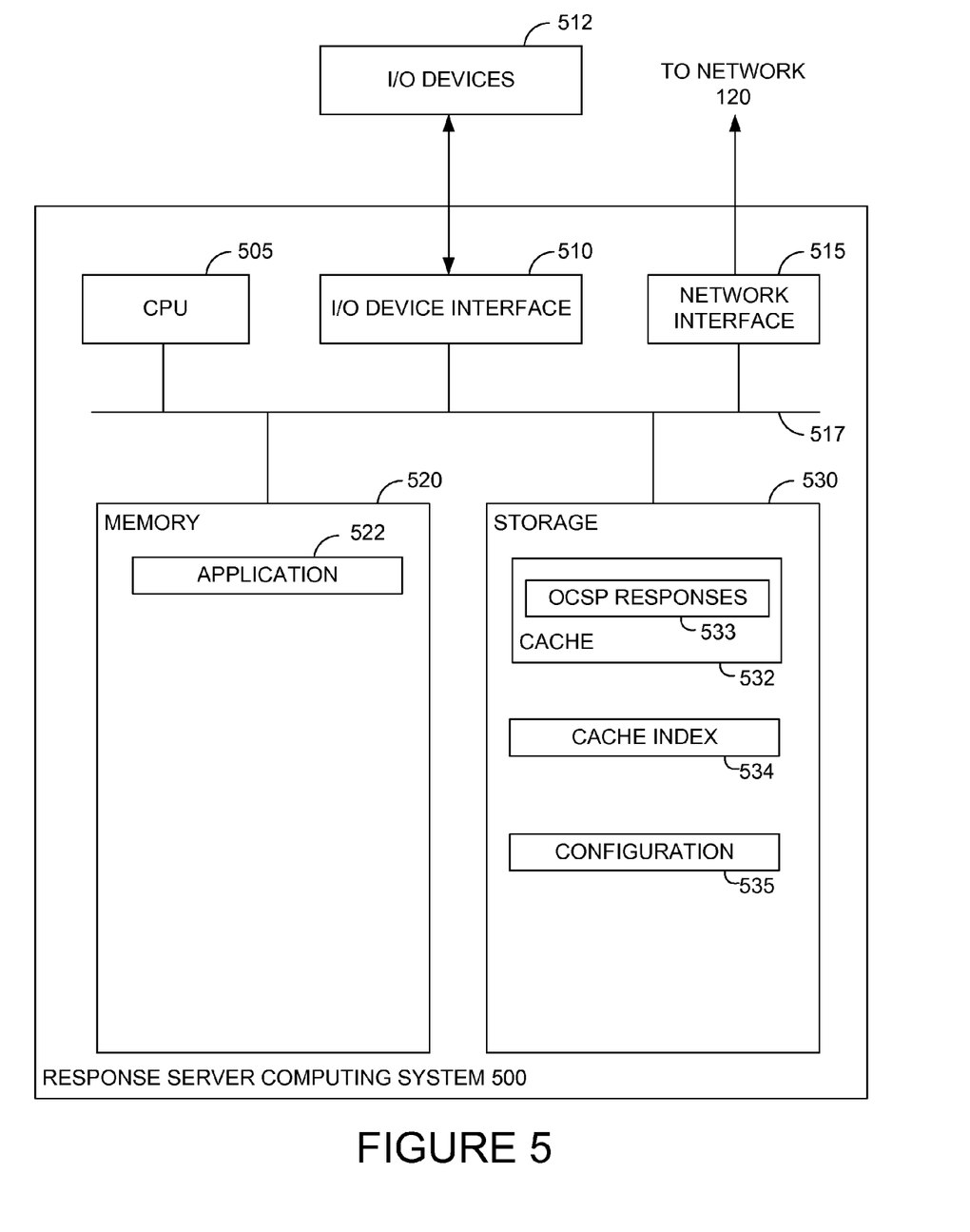
FIG. 5 illustrates an example computing system configured to send responses to certificate status validity requests, according to one embodiment.

FIG. 5 illustrates an example response server computing system 500 configured to distribute OCSP responses, according to one embodiment. As shown, the computing system 500 includes, without limitation, a central processing unit (CPU) 505, a network interface 515, a memory 520, and storage 530, each connected to a bus 517. The computing system 500 may also include an I/O device interface 710 connecting I/O devices 512 (e.g., keyboard, mouse, and display devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an application 522. The storage 530 includes a cache 532, a cache index 534, and a configuration 534. The application 522 is configured to send cached OCSP responses 533 to requesting client computers. When the application 522 receives an OCSP request from a client computer, the application 522 determines a partition number associated with the corresponding OCSP response. If the partition number corresponds to the number assigned to the computing system 500, then the application 522 retrieves the corresponding OCSP response 531 from the cache 532 (e.g., through the cache index 534) and sends the OCSP response 531 to the requesting client. The configuration 534 provides mappings of partition numbers to response servers of the CA.

As described, embodiments presented herein provide techniques for evenly distributing OCSP responses of a CA across multiple OCSP response servers. Advantageously, because the techniques discussed above rely on certificate serial numbers to distribute the generated OCSP responses to the response servers, the OCSP responses are distributed across the servers relatively evenly. Further, this approach allows additional OCSP response servers to be added without adversely affecting the balance of distributed OCSP responses.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for responding to requests to determine a validity status of a digital certificate, the method comprising:
   receiving, by a first response server, a request to provide a status of a digital certificate from a requesting client;
   evaluating the request to identify a response server, of a plurality of response servers, assigned to process the request;
   upon determining the identified response server is the first response server, sending a certificate status validity message corresponding to the request to the requesting client; and
   otherwise, forwarding the request to the identified response server, wherein the identified response server sends the certificate status validity message, which indicates the certificate status as being either valid or invalid, to the requesting client.

2. The method of claim 1, wherein the request is an online certificate status protocol (OCSP) request, and wherein the certificate status validity message is an OCSP response.

3. The method of claim 1, wherein the first response server stores certificate validity messages corresponding to at least one of a plurality of digital certificates in a cache, wherein the first response server is assigned to send the certificate validity messages to requesting clients.

4. The method of claim 3, wherein sending the certificate status validity message comprises:
   retrieving, from the cache, the certificate status validity message corresponding to the request; and
   sending the certificate status validity message to the requesting client.

5. The method of claim 1, wherein evaluating the request comprises:

performing a modulo operation using a last octet of a serial number of the digital certificate identified in the request and a total number of available response servers.

6. The method of claim 5, wherein a result of the modulo operation identifies the response server assigned to process the request.

7. A non-transitory computer-readable storage medium storing instructions, which, when executed on a hardware processor, performs an operation for responding to requests to determine a validity status of a digital certificate, the operation comprising:
   receiving, by a first response server, a request to provide a status of a digital certificate from a requesting client;
   evaluating the request to identify a response server, of a plurality of response servers, assigned to process the request;
   upon determining the identified response server is the first response server, sending a certificate status validity message corresponding to the request to the requesting client; and
   otherwise, forwarding the request to the identified response server, wherein the identified response server sends the certificate status validity message, which indicates the certificate status as being either valid or invalid, to the requesting client.

8. The computer-readable storage medium of claim 7, wherein the request is an online certificate status protocol (OCSP) request, and wherein the certificate status validity message is an OCSP response.

9. The computer-readable storage medium of claim 7, wherein the first response server stores certificate validity messages corresponding to at least one of a plurality of digital certificates in a cache, wherein the first response server is assigned to send the certificate validity messages to requesting clients.

10. The computer-readable storage medium of claim 9, wherein sending the certificate status validity message comprises:
    retrieving, from the cache, the certificate status validity message corresponding to the request; and
    sending the certificate status validity message to the requesting client.

11. The computer-readable storage medium of claim 7, wherein evaluating the request comprises:
    performing a modulo operation using a last octet of a serial number of the digital certificate identified in the request and a total number of available response servers.

12. The computer-readable storage medium of claim 11, wherein a result of the modulo operation identifies the response server assigned to process the request.

13. A system, comprising:
    a hardware processor; and
    a memory hosting an application, which, when executed on the processor, performs an operation for responding to requests to determine a validity status of a digital certificate, the operation comprising:
      receiving, by a first response server, a request to provide a status of a digital certificate from a requesting client;
    evaluating the request to identify a response server, of a plurality of response servers, assigned to process the request;
      upon determining the identified response server is the first response server, sending a certificate status validity message corresponding to the request to the requesting client; and
      otherwise, forwarding the request to the identified response server, wherein the identified response server sends the certificate status validity message, which indicates the certificate status as being either valid or invalid, to the requesting client.

14. The system of claim 13, wherein the request is an online certificate status protocol (OCSP) request, and wherein the certificate status validity message is an OCSP response.

15. The system of claim 13, wherein the first response server stores certificate validity messages corresponding to at least one of a plurality of digital certificates in a cache, wherein the first response server is assigned to send the certificate validity messages to requesting clients.

16. The system of claim 15, wherein sending the certificate status validity message comprises:
    retrieving, from the cache, the certificate status validity message corresponding to the request; and
    sending the certificate status validity message to the requesting client.

17. The system of claim 13, wherein evaluating the request comprises:
    performing a modulo operation using a last octet of a serial number of the digital certificate identified in the request and a total number of available response servers.

18. The system of claim 13, wherein a result of the modulo operation identifies the response server assigned to process the request.

* * * * *